United States Patent
Seppanen

(10) Patent No.: US 7,606,543 B1
(45) Date of Patent: Oct. 20, 2009

(54) SIGNAL QUALITY INDICATOR APPARATUS AND METHOD PARTICULARLY USEFUL FOR MOBILE TELEPHONES

(75) Inventor: Jorma Antero Seppanen, Irving, TX (US)

(73) Assignee: Nokia Mobile Phones, Irving, TX (US)

( * ) Notice: Subject to any disclaimer, the term of this patent is extended or adjusted under 35 U.S.C. 154(b) by 571 days.

(21) Appl. No.: 09/454,124

(22) Filed: Dec. 3, 1999

(51) Int. Cl.
   H04B 17/00 (2006.01)

(52) U.S. Cl. .............. 455/226.2; 455/67.7; 455/421

(58) Field of Classification Search .......... 455/423, 455/67.1, 67.3, 67.7, 226.1, 226.2, 226.4, 455/421; 370/493
See application file for complete search history.

(56) References Cited

U.S. PATENT DOCUMENTS

| | | | | |
|---|---|---|---|---|
| 5,381,460 A | * | 1/1995 | Ohashi et al. | 455/566 |
| 5,745,842 A | * | 4/1998 | Priest | 455/69 |
| 5,802,039 A | * | 9/1998 | Obayashi et al. | 370/216 |
| 5,809,414 A | * | 9/1998 | Coverdale et al. | 455/421 |
| 5,812,968 A | * | 9/1998 | Hassan et al. | 704/221 |
| 5,842,141 A | * | 11/1998 | Vaihoja et al. | 455/574 |
| 5,966,667 A | * | 10/1999 | Halloran et al. | 455/552 |
| 6,167,259 A | * | 12/2000 | Shah | 455/424 |
| 6,219,540 B1 | * | 4/2001 | Besharat et al. | 455/421 |
| 6,243,568 B1 | * | 6/2001 | Detlef et al. | 455/226.4 |
| 6,381,451 B1 | * | 4/2002 | Parisel et al. | 455/343 |
| 6,445,916 B1 | * | 9/2002 | Rahman | 455/423 |
| 6,466,832 B1 | * | 10/2002 | Zuqert et al. | 700/94 |
| 6,477,198 B1 | * | 11/2002 | Gumm | 375/228 |
| 6,539,205 B1 | * | 3/2003 | Wan et al. | 370/465 |

FOREIGN PATENT DOCUMENTS

| | | | |
|---|---|---|---|
| GB | 2275848 A | * | 9/1994 |
| GB | 2277849 A | * | 11/1994 |
| WO | WO 00/52874 | | 9/2000 |
| WO | WO 01/01722 | | 1/2001 |

* cited by examiner

*Primary Examiner*—Sujatha Sharma
(74) *Attorney, Agent, or Firm*—Alston & Bird LLP

(57) ABSTRACT

The quality of radio frequency signals received at a mobile phone or cellphone is sampled. The results are employed to produce a human discernible indication such as by blinking a received signal strength bar on a display. The bar remains constant without blinking if the signal quality is at or below a preselected minimum and can have the blinking rate increase as the sensed signal quality decreases. Distortion can be determined in either the digital or analog mode. Digital signal quality can be reflected in the sensed bit error rate while the level of analog signal quality can be determined from the supervisory audio tone.

8 Claims, 4 Drawing Sheets

SIGNAL QUALITY INDICATOR APPARATUS AND METHOD PARTICULARLY USEFUL FOR MOBILE TELEPHONES

BACKGROUND OF THE INVENTION

1. Field of the Invention

The present invention relates to apparatus and methods for indicating the quality of received signals. The present invention is particularly useful in conjunction with mobile telephones or cell-phones.

2. Description of the Related Art

A conventional mobile phone typically displays the channel signal strength information, such as by presenting a vertical bar or horizontal bar. The amount so displayed is based upon the current channel Received Signal Strength (RSSI). There is a problem with such displays in that the RSSI does not reflect anything about the channel quality for the user.

Even when the RSSI is indicated as very good, the user can experience degenerated call quality because of interference, etc., despite an acceptable quantity of RSSI. Further, with no indication that the signal quality has deteriorated or is unacceptable, the user might erroneously conclude that there is a problem with the phone unit instead of a loss of acceptable received signal quality.

SUMMARY OF THE INVENTION

The quality of a received signal is detected. The results of this detection are presented to the user as by any one or more of a variety of indicators. For example, blinking signal strength displays could indicate the channel quality. An audible alert could be employed as could text on the display, a vibrating indicator, an icon, indicator lights including variable intensity and/or variable color displays, and the like.

Also audio signal quality could be used for the same purpose; namely, an indication of the extent of distortion of the signal.

The method of this invention indicates the quality of a received signal at a mobile phone which a signal is received from a remote transmitter. This received signal is inspected to determine its quality. An output correlated to the results of said inspecting step is then provided in the form of a user discernible indication in response to that output.

This inspecting step can include the step of comparing the received signal with a predetermined threshold. Further, the providing step can include the step of generating a first output whenever the comparing step has met the aforesaid threshold and for otherwise generating a second output different from that first output.

The present invention is useful in conjunction with a digital transmission and receiving system wherein the inspecting step can include the step of determining the BER of the received signal over a predetermined sampling period. It is also possible to ensure that the received signal has failed to meet the threshold value for a predetermined time-out period before generating the output indicative of such a failure.

It is particularly useful for the providing step to include the step of establishing a visual indicator for the user discernible indication although a variety of user-sensible indicators are possible.

Apparatus in accordance with this invention provides an indication of the quality of a received signal at a mobile phone. A signal receiving antenna on the mobile phone receives signals transmitted from a remote location. A signal quality determining arrangement in the mobile phone is coupled for inspecting this received signal, and provides an output signal indicative thereof. A user-discernible indication generator is then operable in response to this output signal.

This signal quality determining arrangement can include a comparator device coupled for comparing the received signal with a predetermined threshold. The comparator generates a first output whenever the received signal has met the threshold level while otherwise generating a second output different from the first output. The apparatus is useful in conjunction with a digital transmission and receiving system. In this case, it typically can include a BER measuring device operable over a selected sampling period.

The apparatus can further include a time-out circuit coupled between the signal quality measuring arrangement and the user discernible signal generator for ensuring that the received signal has maintained its measured level relative to this threshold value for a predetermined period before generating the user discernible output.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

Figure 1:
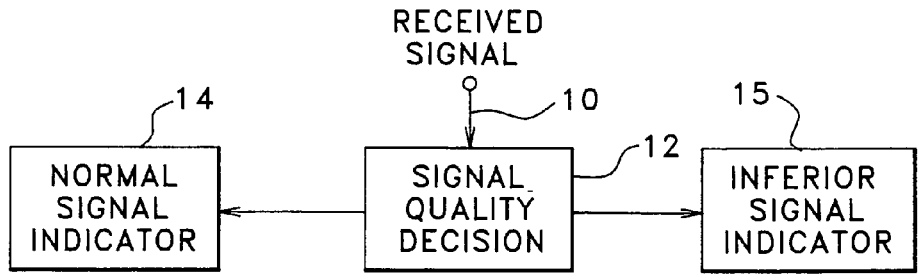
FIG. 1 is a block diagram of the operation of one embodiment of the present invention.

FIG. 1 illustrates the primary function of the present invention wherein a received communication signal 10 is inspected and a signal quality decision 12 is reached relative to that signal. In the presence of a transmitted signal 10 which is of an acceptable quality, a normal signal indicator 14 is actuated. Conversely, if the received signal 10 is below a minimum quality threshold, an inferior signal indicator 15 is enabled or actuated.

Figure 2:
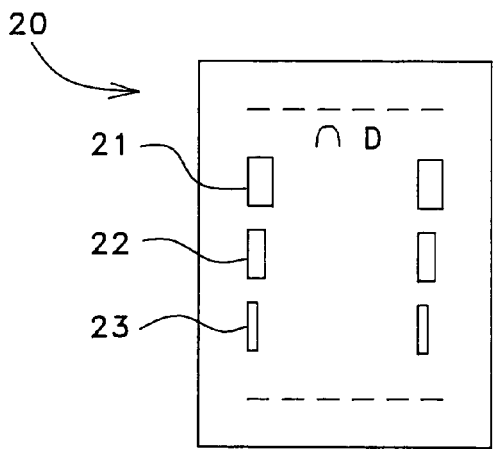
FIG. 2 is a view of a typical mobile phone display suitable for use in conjunction with the present invention.

For example, the present invention can operate in conjunction with a display 20, shown in FIG. 2, contained on a mobile phone or cell-phone. In this display, a series of bars 21, 22 and 23 along the left side reflect various signal strength indications. Whenever the signal quality decision 12 in an active digital mode determines that the Bit Error Rate (BER) is at or near 0.0%, indicators bars 21-23 on the left side are shown constant without blinking. If the signal quality deteriorates such that the BER drops below a minimum value such as a BER greater than 4%, left indicators 21-23 are caused to start blinking. The initiation of the blinking can occur after a preselected time-out such as 0.5 seconds, for example.

When the display begins blinking, or otherwise indicating that the received signal quality has deteriorated, the user can take steps to improve the received signal quality. For instance, the user can change the position of the mobile phone while monitoring the display. If the signal quality improves adequately, the user will observe that the blinking has stopped and the signal bar is shown constantly on the display. Otherwise, the blinking will continue. Note that the quality indication is possible through other means such as audible, textual or vibratory arrangements, or any combination thereof.

Note further that the rate of blinking can be adjusted in steps from constant display without blinking for clear or minimally reduced signal quality to a rapid blinking for unacceptable quality. Blinking rates between those two boundary conditions can be proportioned to the magnitude of the signal quality deterioration. It is likewise preferable to employ a time-out before a poor quality indication is presented. This would prevent an erroneous quality deterioration display or signal in response to a transient received signal aberration.

The present invention is also useful in conjunction with an analog mode control channel. All incoming messages include a Cyclic Redundancy Check (CRC) repeated five times. This can include the analog signal. The quality indicator can be determined by the number of correct CRC's are received. For an analog voice channel, the Supervisory Audio Tone (SAT) can be used to monitor channel quality in that it is possible to measure the SAT signal level For both the digital mode control channel and the digital mode traffic channel, the BER is useful in determining channel quality.

In FIG. 1, normal signal indicator 14 reflects a situation wherein channel quality is good. The poor or inferior signal indicator 15 refers to a situation where the signal quality is weak or unacceptable. For instance, the poor signal criteria may be said to exist whenever BER is greater than 4% for a duration of one second, whereas good quality can be said to exist if the BER remains less than 1% for one second. The exact values for criteria can be determined on a case-by-case basis.

The present invention gives the user an easily deciphered indication of signal quality. In the prior art, while the user receives an indication of signal quantity, the user does not get an indication of received signal quality. Thus, the user of a prior art mobile phone is as likely to conclude that deteriorated speech quality is a function of a malfunction of the phone when the fault lies with the communication network. Thus, the present invention facilitates trouble analysis by the user.

Figure 3:
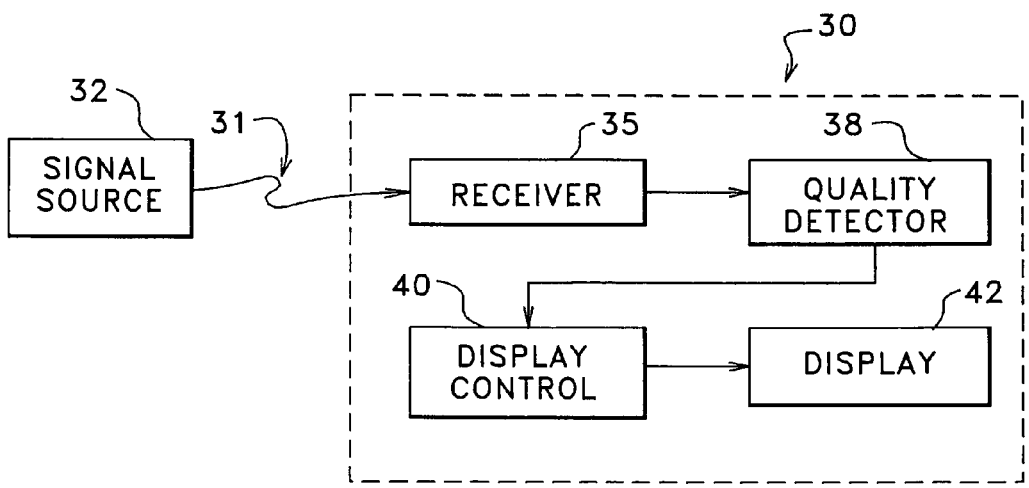
FIG. 3 is a block diagram of the elements associated with a mobile telephone incorporating the present invention.

FIG. 3 is a block diagram of a mobile telephone, or cellphone 30, modified to incorporate the present invention. Signal source 32 transmits a radio frequency signal 31 which is detected by receiver 35 of phone 30. That signal is handled by conventional circuitry (not shown) in the phone to produce an audible and/or visible signals for the user.

The signal produced by receiver 35 is monitored by quality detector 38. For a digital system, quality detector 38 could inspect the BER over predetermined sampling periods to produce a signal to display controls 40 thereby actuating the display 42. This conveys a human discernible signal, such as a flashing display, warning light actuation, audible tone, or any suitable output to the user.

Figure 4:
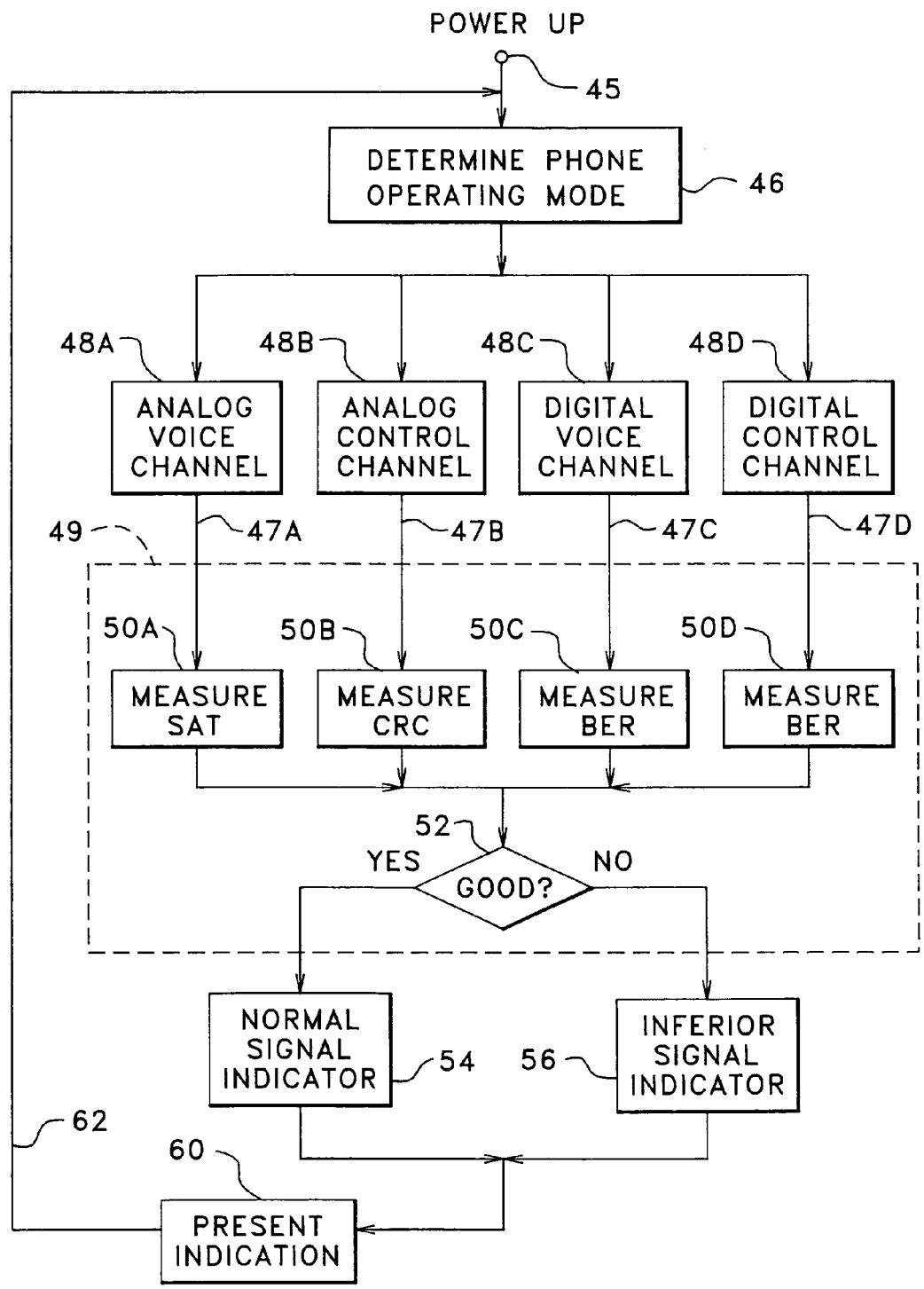
FIG. 4 is a flowchart illustrating one embodiment of the present invention.

An embodiment of the process for operating with both digital and analog systems is shown in the flowchart of FIG. 4. Upon power up 45 of the apparatus, a determination 46 is made as to the phone operating mode. Thus, if an analog voice channel is determined to be present, branch 48A is enabled. The presence of an analog control channel signal enables branch 48B whereas digital voice and control channels are enabled through branches 48C and 48D, respectively.

Each branch proceeds with a quality measurement process 49. Thus, for the analog voice channel, a SAT measurement 50A is made. For analog control, the CRC measurement 50B is performed while the digital BER acceptability for either of the two digital channels is determined in blocks 50C and 50D. In all four cases, a decision 52 is made as to whether the quality of the received signal is good or not good. A normal signal indicator 54 is enabled in the former situation whereas an inferior signal indicator 56 is enabled for the latter.

A time out function in elements 50 are for the purpose of ensuring that the detected condition has persisted long enough to be considered a valid indication. Thus, if the signal has persisted for a long enough period, a "yes" output causes the appropriate display indication 60. Conversely, failure of the signal to persist throughout the time-out period causes enablement of return 62 to recycle the process. A similar result is produced after enabling the indication at 60 after it is sensed that another sampling cycle should be initiated.

For an analog system, the SAT might typically be a 5470 Hz, 6000 Hz or 6030 Hz tone transmitted by the base station.

Figure 5:
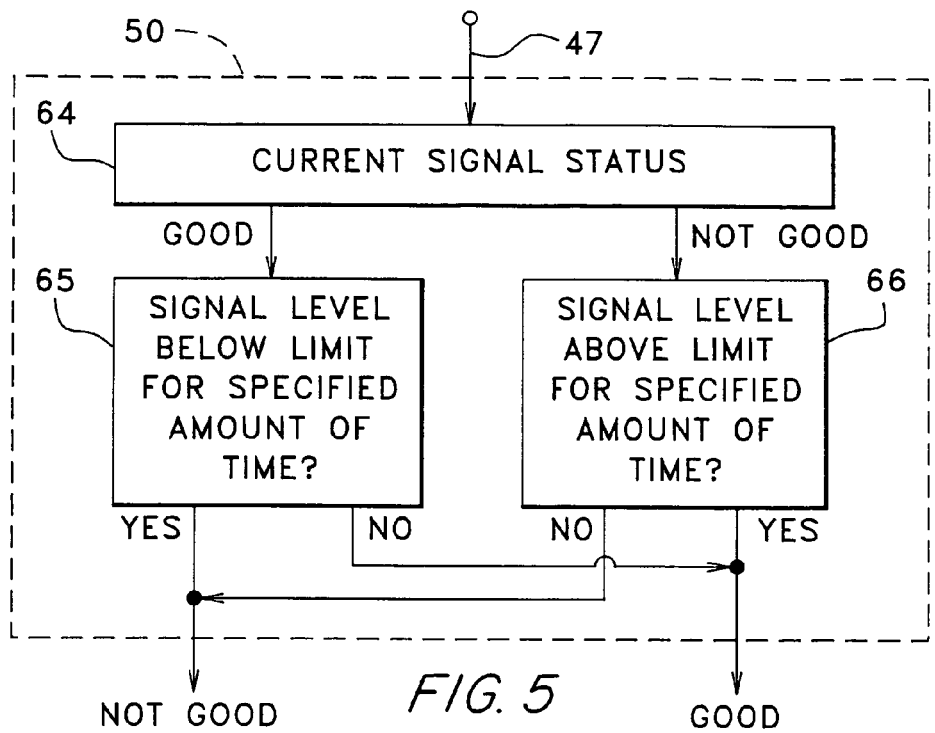
FIG. 5 is a flowchart of the quality decision elements of FIG. 4.

A typical quality decision 50 within block 49 of FIG. 4 is shown in greater detail in FIG. 5. The current signal quality indicator status is determined in block 64, that is if the signal is currently displayed as "good" or "not good". Depending on the status, the decision goes to block 65 or 66, respectively. If the quality of the signal is below the predetermined level, a decision 65 is then made as to whether this signal condition has remained below the predetermined minimum level for a specified amount of time. If it has, then the decision is made that a "not good" signal quality condition exists and the output so indicates. If it fails to stay below the minimum, it is presumed that a "good" condition exists, and that output is so indicated. The inverse decision process is provided by 66.

Figure 6:
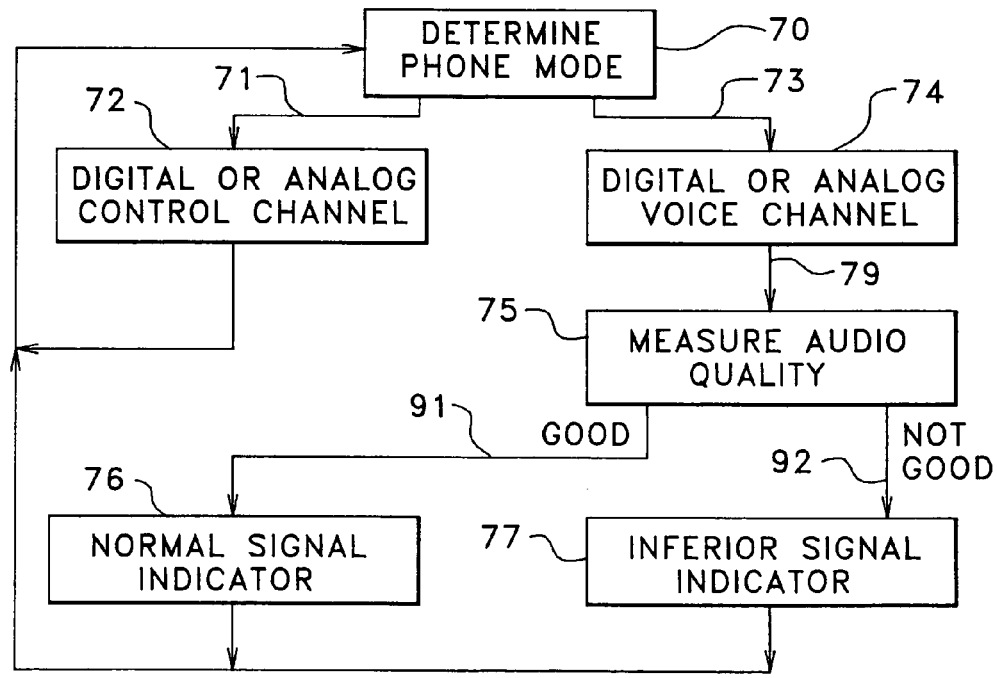
FIG. 6 is a block diagram of a signal quality indication system based upon an audio quality measurement.
Figure 7:
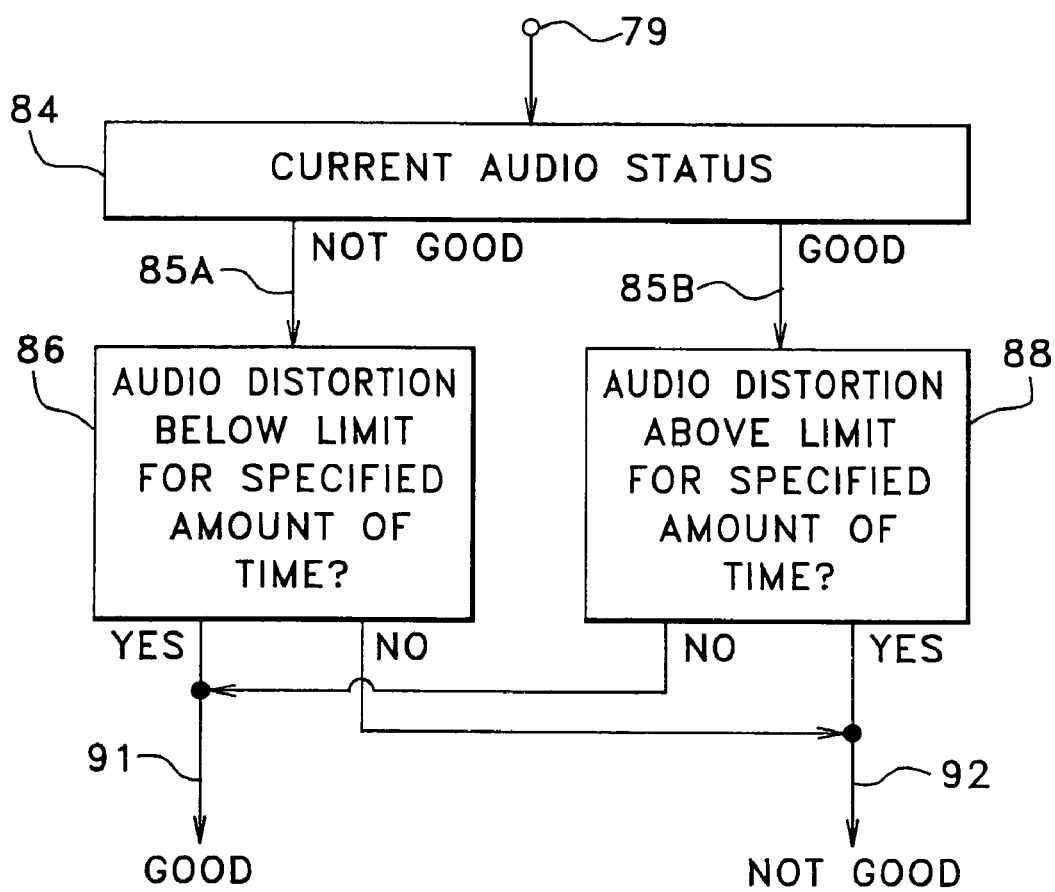
FIG. 7 is a more detailed diagram of the audio quality measurement element of FIG. 6.

FIG. 6 is a block diagram of a signal quality indication system based upon an audio quality measurement, while FIG. 7 is a more detailed diagram of the audio quality measurement element of FIG. 6. In this embodiment, a phone mode determination is initially provided to indicate either digital or analog control output signal 71 is to be introduced to block 72, or a digital or analog voice signal at 73 is to be introduced to voice channel 74.

In the FIG. 6 system, the voice channel signal quality is measured at block 75 which is shown in greater detail in FIG. 7. As described previously herein, the decision results in either a good output 91, or a bad output 92. The former enables the normal signal quality indicator 76, while the latter enables the inferior signal indicator 77. A time-out function is once again employed to ensure that the signal condition is maintained for more than a transient period of time.

In FIG. 7, the current audio status element 84 determines the currently displayed audio quality indicator, that is, if the signal is currently displayed as "good" or "not good". Depending on the status, the decision goes to element 85A or 85B respectively. Element 86 then determines if the audio distortion has remained below the limit for a preselected period of time. If it has, the output good 91 is produced. Otherwise, output not good 92 is produced. The inverse decision process is provided by block 88.

Once again, failure of the distortion level to remain above the specified level of the selected period of time raises the presumption that the distortion was merely a transient.

Note that production of an inferior signal indicator, such as at 77 in FIG. 6, can be supplemented with an indicator of the magnitude of inferiority if desired. By way of example, if indicator 77 produces an output that suggests a signal quality is some percentage of acceptable, the indicator output can be arranged to so indicate. As a further example, if an unacceptable quality is reflected by a light that blinks at X cycles per minute, a determination that the quality measurement is half that amount could produce X/2 cycles per minute of blinking.

Of course, a solid number display could actually present numbers representative of the amount of quality or distortion actually measured. Furthermore, controlled gray scaling of a display can be employed as a quality level indicator.

While the invention has been particularly shown and described with reference to a preferred embodiment thereof, it will be understood by those skilled in the art that various other changes in the form and details may be made without departing from the spirit and scope of the invention.

What is claimed is:

1. The method of indicating the quality of a received signal at a mobile phone, the received signal sent to the mobile phone by a remote transmitter, said method for use in conjunction with a digital transmission and receiving system and comprising:
   - detecting reception of the received a signal from the remote transmitter at the mobile phone,
   - inspecting said received signal by comparing said received signal with a predetermined threshold for determining its quality, at least in terms of a percentage of acceptable, wherein inspecting the received signal comprises determining a bit error rate (BER) of the received signal over a sampling period,
   - providing an output correlated to the results of said inspecting step such that when said received signal has met said predetermined threshold with which said received signal is compared during said operation of comparing, the output is of a first type and, otherwise, the output is of a second type, the second type different than the first type, and the output indicative of the quality of the received signal in terms of the percentage of acceptable,
   - ensuring that said received signal has failed to meet said threshold value for a predetermined time-out period before generating the said output indicative of such a failure, and
   - providing a user discernible indication in response to said output provided during said operation of providing the output, the user discernible indication indicative of the quality of the received signal in terms of the percentage of acceptable.

2. The method of indicating the quality of a received signal at a mobile phone, the received signal sent to the mobile phone by a remote transmitter, said method comprising the steps of
   - detecting reception of the received signal from the remote transmitter at the mobile phone,
   - separating control signals from voice signals,
   - inspecting said received voice signal for determining its quality is at least either above or below a predetermined threshold by comparing said received voice signal with the predetermined threshold, the predetermined threshold forming a boundary condition, and the voice signal, when of a quality less than the predetermined threshold, indicated in terms of a percentage of acceptable and, when of a quality more than the predetermined threshold also indicated in terms of a percentage of acceptable,
   - providing an output correlated to the results of said inspecting step, and
   - providing a user discernible indication in response to said output that indicates the quality of the received voice signal in terms of the percentage of acceptable.

3. The method in accordance with claim 2 wherein said inspecting step includes the step of quantifying the amount, in terms of the percentage of acceptable, by which said voice signal fails to meet said predetermined threshold, and
   - said user discernible indication step includes the step of correlating the amount of said user discernible indication to the result of said quantifying step.

4. The method in accordance with claim 2 wherein said user discernible providing step includes the step of causing a visible display to pulsate.

5. The method of claim 4 wherein the amount of said display pulsation is correlated to the amount, in terms of the percentage of acceptable, said received voice signal departs from said predetermined threshold level.

6. The method in accordance with claim 2 wherein said user discernible providing step includes the step of causing a user discernible audio signal indicating the voice signal quality.

7. The method in accordance with claim 6 which includes the step of correlating the magnitude of said voice signal to the amount of departure of said voice signal from said predetermined threshold.

8. The method in accordance with claim 2 which includes the step of ensuring that the results of said inspecting step have remained over a preselected time-out period before generating the said user discernible indication.

* * * * *